US012177958B2

(12) United States Patent
Kawase et al.

(10) Patent No.: US 12,177,958 B2
(45) Date of Patent: Dec. 24, 2024

(54) X-RAY GENERATING APPARATUS, X-RAY IMAGING APPARATUS, AND MOLD TRANSFORMER

(71) Applicant: CANON ANELVA CORPORATION, Kawasaki (JP)

(72) Inventors: Junya Kawase, Yokohama (JP); Hiroshi Saito, Ayase (JP)

(73) Assignee: Canon Anelva Corporation, Kawasaki (JP)

( * ) Notice: Subject to any disclaimer, the term of this patent is extended or adjusted under 35 U.S.C. 154(b) by 0 days.

(21) Appl. No.: 18/650,614

(22) Filed: Apr. 30, 2024

(65) Prior Publication Data

US 2024/0306283 A1 Sep. 12, 2024

Related U.S. Application Data

(63) Continuation of application No. PCT/JP2023/009198, filed on Mar. 10, 2023.

(51) Int. Cl.
*H05G 1/06* (2006.01)
*H05G 1/02* (2006.01)

(52) U.S. Cl.
CPC ............... *H05G 1/06* (2013.01); *H05G 1/025* (2013.01)

(58) Field of Classification Search
CPC ........................................................ H05G 1/06
See application file for complete search history.

(56) References Cited

U.S. PATENT DOCUMENTS 1,408,989 A * 3/1922 Coolidge ................. H05G 1/06 313/46
4,355,410 A * 10/1982 Sullins ................... H05G 1/025 378/199
11,039,526 B2 6/2021 Suzuki et al.
2016/0020015 A1* 1/2016 Moreno Vallejo ........................... H01F 27/2823 336/98

FOREIGN PATENT DOCUMENTS

JP S60153515 U 10/1985
JP H09115744 A 5/1997
JP 2008153293 A 7/2008
(Continued)

OTHER PUBLICATIONS

Decision to Grant a Patent for Japanese Application 2023-546350, mailed on Dec. 8, 2023 (5 pages).
(Continued)

*Primary Examiner* — Chih-Cheng Kao
(74) *Attorney, Agent, or Firm* — Buchanan Ingersoll & Rooney PC

(57) ABSTRACT

An X-ray generating apparatus comprises a storage housing, an insulating housing arranged in the storage housing, an X-ray generating tube arranged at least partly in the insulating housing, and a plurality of electrical components arranged in the insulating housing. In the X-ray generating apparatus, the plurality of electrical components include a mold transformer, the mold transformer includes a core, an insulator covering the core, and a heat-dissipating path configured to move heat from the core to an external space of the insulator, and the heat-dissipating path includes a hole provided in the insulator to extend from the external space toward the core.

14 Claims, 8 Drawing Sheets

(56) References Cited

FOREIGN PATENT DOCUMENTS

| | | | |
|---|---|---|---|
| JP | 2014041884 | A | 3/2014 |
| JP | 2017120715 | A | 7/2017 |
| JP | 2018206676 | A | 12/2018 |

OTHER PUBLICATIONS

International Search Report (PCT/ISA/210) and Written Opinion (PCT/ISA/237) mailed on May 23, 2023, by the Japan Patent Office as the International Searching Authority for International Application No. PCT/JP2023/009198. (9 pages).

* cited by examiner

X-RAY GENERATING APPARATUS, X-RAY IMAGING APPARATUS, AND MOLD TRANSFORMER

CROSS-REFERENCE TO RELATED APPLICATIONS

This application is a Continuation of International Patent Application No. PCT/JP2023/009198, filed Mar. 10, 2023, which is hereby incorporated by reference herein in its entirety.

BACKGROUND OF THE INVENTION

Field of the Invention

The present invention relates to an X-ray generating apparatus, an X-ray imaging apparatus, and a mold transformer.

Background Art

An X-ray generating apparatus used in an inspection apparatus or the like is required to achieve downsizing and improvement in voltage resistance. The use of a mold transformer may be advantageous for this purpose. However, it is difficult for a conventional mold transformer to efficiently dissipate core heat. This may impair the stability of the operation of the X-ray generating apparatus.

SUMMARY OF THE INVENTION

The present invention provides a technique advantageous in improving the stability of the operation of an X-ray generating apparatus.

A first aspect of the present invention is directed to an X-ray generating apparatus, and the X-ray generating apparatus comprises a storage housing, an insulating housing arranged in the storage housing, an X-ray generating tube arranged at least partly in the insulating housing, and a plurality of electrical components arranged in the insulating housing. The plurality of electrical components include a mold transformer, the mold transformer includes a core, an insulator covering the core, and a heat-dissipating path configured to move heat from the core to an external space of the insulator, and the heat-dissipating path includes a hole provided in the insulator to extend from the external space toward the core.

A second aspect of the present invention is directed to a mold transformer, and the mold transformer comprises a core, an insulator covering the core, and a heat-dissipating path configured to move heat from the core to an external space of the insulator, wherein the heat-dissipating path includes a hole provided in the insulator so as to extend from the external space toward the core.

DESCRIPTION OF EMBODIMENTS

Figure 1:
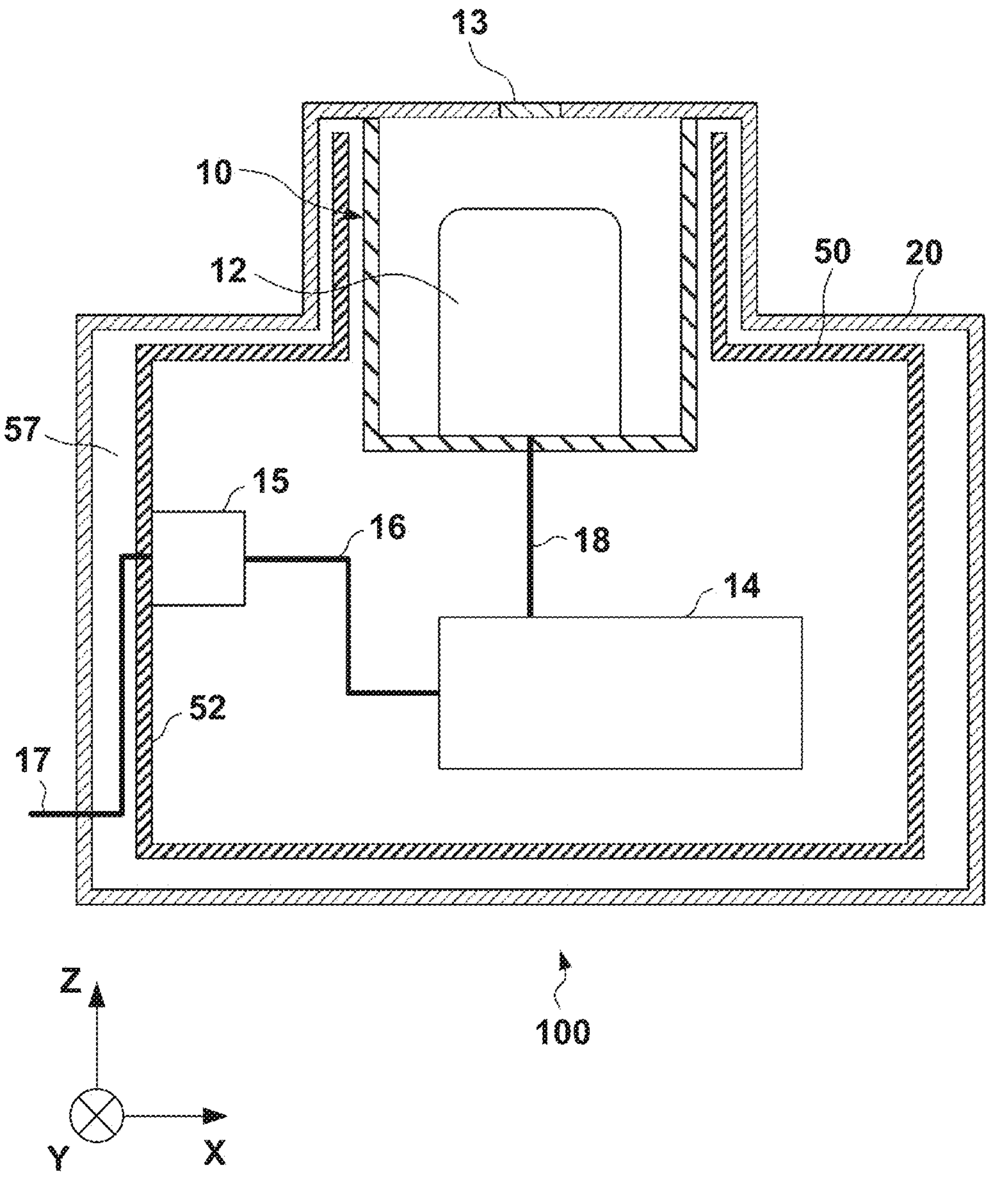
FIG. 1 is a view schematically showing the arrangement of an X-ray generating apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In this specification and accompanying drawings, directions and placements are defined in the XYZ coordinate system.

FIG. 1 is a view schematically showing the arrangement of an X-ray generating apparatus 100 according to an embodiment of this disclosure. The X-ray generating apparatus 100 can include a storage housing 20, an insulating housing 50 arranged in the storage housing 20, an X-ray generating tube 10 arranged at least partly in the insulating housing 50, and a plurality of electrical components arranged in the insulating housing 50. The storage housing 20 can be formed from a conductive member. The insulating housing 50 is formed from an insulator. The insulating housing 50 can have one or a plurality of openings. The X-ray generating tube 10 can be arranged at least partly in the insulating housing 50 so as to extend from the inside of the insulating housing 50 through one opening of the insulating housing 50. Part of the storage housing 20 can be shared with the X-ray generating tube 10.

The plurality of electrical components can include a driving circuit 14, a mold transformer 15, and cables 16 and 18. The mold transformer 15 has a primary winding electrically connected to a cable 17 drawn from the outside of the storage housing 20 and a secondary winding electrically connected to the cable 16. The driving circuit 14 drives the X-ray generating tube 10 by using the power supplied from the mold transformer 15 through the cable 16. The driving circuit 14 can include a boosting circuit. The boosting circuit can include, for example, a Cockroft Walton circuit (CW circuit). The boosting circuit can generate a negative high voltage to, for example, the storage housing 20.

The X-ray generating tube 10 can include a cathode 12 including an electron emission unit that emits electrons and an anode 13 including a target that generates X-rays by collision with the electrons emitted from the electron emission unit. The storage housing 20 may be grounded. The anode 13 of the X-ray generating tube 10 can be electrically connected to the storage housing 20. The driving circuit 14 can supply a negative potential to the cathode 12 of the X-ray generating tube 10 via the cable 18. The cables 16 and 18 each can include a conductive member and an insulating material covering the conductive member but may not include an insulating material. The space inside the insulating housing 50, a space 57 between the storage housing 20 and the insulating housing 50, and the space between the insulating housing 50 and the X-ray generating tube 10 may be filled with an insulating liquid (for example, an insulating oil). The space inside the driving circuit 14 can also be filled with an insulating liquid. The cathode 12 of the X-ray generating tube 10 and the storage housing 20 are electrically insulated. The space 57 between the storage housing 20 and the insulating housing 50 can function as a convection space that can cause convection of the insulating liquid. The insulating housing 50 can include a wall 52 that supports the mold transformer 15. The wall 52 may have a planar shape, a curved surface shape, or another shape. The wall 52 has a support surface 521 that supports the mold transformer 15.

Figure 2:
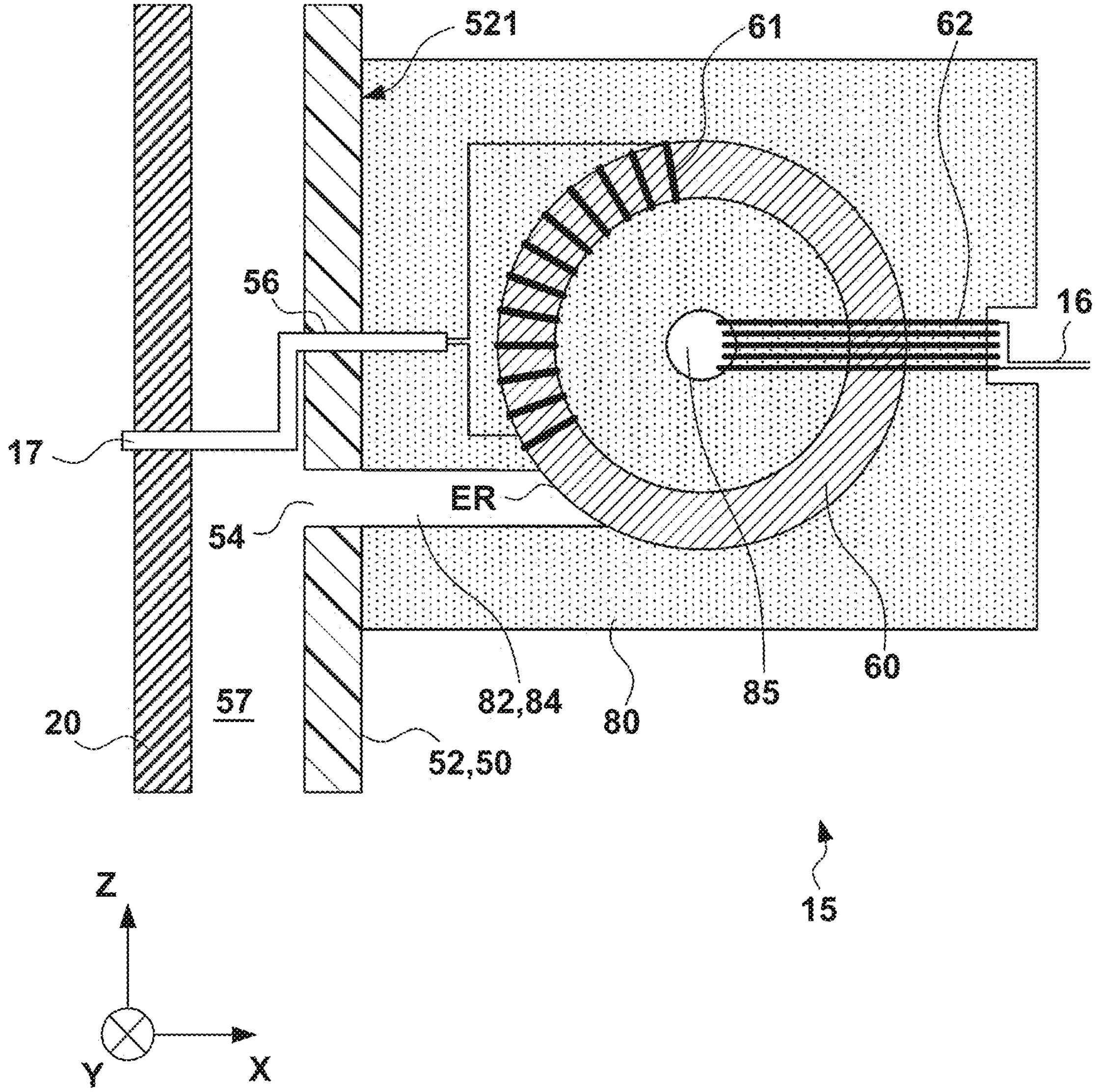
FIG. 2 is a sectional view schematically showing the arrangement of a mold transformer.
Figure 3:
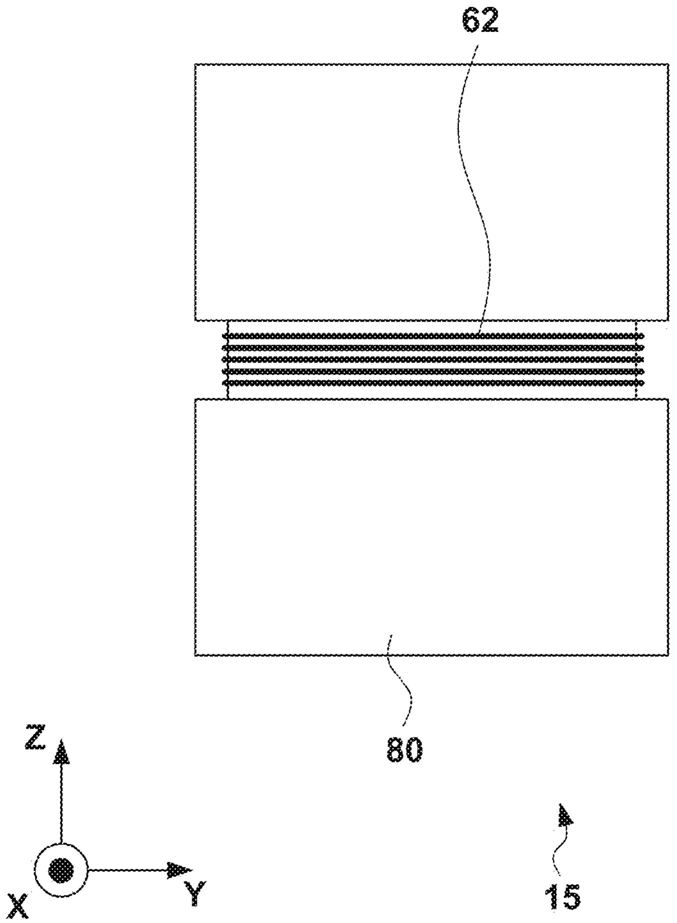
FIG. 3 is a side view schematically showing the arrangement of the mold transformer.

FIGS. 2 and 3 schematically show the arrangement of the mold transformer 15. FIG. 2 is a schematic sectional view of the mold transformer 15. FIG. 3 is a side view of the mold transformer 15 viewed from the plus direction of the X-axis. Although not shown in FIG. 3, the wall 52 of the insulating housing 50 is placed behind the mold transformer 15 so as to support the mold transformer 15. The mold transformer 15 can include a core 60, an insulator 80 covering the core 60, and a heat-dissipating path 82 that moves heat from the core 60 to the external space of the insulator 80. The heat-dissipating path 82 includes a hole 84 provided in the insulator 80 so as to extend from the external space of the insulator 80 toward the core 60. The heat-dissipating path 82 is, for example, a space or a channel and is filled with an insulating liquid. The heat-dissipating path 82 may be configured such that an exposed portion ER as part of the core 60 is exposed to the external space of the insulator 80 through the heat-dissipating path 82. Alternatively, the heat-dissipating path 82 may be configured such that the exposed portion ER as part of the core 60 is exposed to the external space of the insulator 80 through the heat-dissipating path 82 and a film. The film is provided to sufficiently move the heat of the core 60 to the external space through the heat-dissipating path 82. The heat-dissipating path 82 may include a member formed from an insulating material (for example, alumina) having a higher thermal conductivity than the insulator 80. The insulating housing 50 or the wall 52 has a through opening 54. The heat-dissipating path 82 or the hole 84 may communicate with or face the external space of the insulator 80, for example, the space 57 through the through hole 54.

The core 60 can be a toroidal core. The insulator 80 is formed by molding to cover the core 60. The insulator 80 is formed from, for example, a resin. The insulator 80 can have a through hole 85 arranged to extend through the opening portion of the core 60. The mold transformer 15 can include a first winding covered with the insulator 80 wound around the core 60 and a second winding wound around the core 60 through the insulator 80. The second winding can be wound around the core 60 through the insulator 80 (part of it) so as to extend through the through hole 85 of the insulator 80. The first winding and the second winding are expressions for discriminating the two windings from each other. In the example shown in FIG. 2, the first winding is a primary winding 61, and the second winding is a secondary winding 62. That is, in the example shown in FIG. 2, the mold transformer 15 can include the primary winding 61 covered with the insulator 80 and the secondary winding 62 wound around the core 60 through the insulator 80 (part of it). The secondary winding 62 can be wound around the 60 through the insulator 80 (part of it) so as to extend through the through hole 85 of the insulator 80.

Unlike the arrangement shown in FIG. 2, the mold transformer 15 may include the secondary winding 62 covered with the insulator 80 and the primary winding 61 wound around the core 60 through the insulator 80 (part of it). In this case, the primary winding 61 can be wound around the 60 through the insulator 80 (part of it) so as to extend through the through hole 85 of the insulator 80.

With reference to the example shown in FIG. 2, the insulation property of the mold transformer 15 can depend on the creepage distance (the shortest distance along the surface of the insulator 80) between the secondary winding 62 and the exposed portion ER of the core 60. In evaluating the creepage distance, a position on the secondary winding 62 which should be considered is, for example, a position near the exit of the through hole 85. That is, the creepage distance can be the shortest distance along the surface of the insulator 80 between the secondary winding 62 and the exposed portion ER near the exit of the through hole 85.

The primary winding 61 can be connected to the cable 17 through, for example, a wiring hole 56 provided in the insulating housing 50 or the wall 52. The cable 17 and the primary winding 61 may be electrically connected to each other through a conductive member such as a screw inserted into the wiring hole 56. The primary winding 61 can have a positive terminal and a negative terminal and may have a positive terminal, a negative terminal, and a ground terminal. The cable 17 can include conductive wires corresponding to the number of terminals of the primary winding 61.

The core 60 can be a toroidal core, as described above and may be a core having another shape, for example, an EI core, EE core, EER core, or PQ core. The exposed portion ER may be provided on the cylindrical surface (outer circumferential surface) of the core 60 or an end face (a surface parallel to the XZ surface in FIG. 2) of the core 60, that is, a surface orthogonal to the axial direction (the Y direction in FIG. 2) of the core 60. Alternatively, the exposed portions ER may be provided on both the cylindrical surface or the outer circumferential surface and the end face.

In order to implement high cooling performance, the heat-dissipating path 82 is preferably arranged to transfer the heat of the core 60 to the space 57 (convection space) arranged between the storage housing 20 and the insulating housing 50, that is, to extend toward the space 57. Alternatively, the heat-dissipating path 82 may be arranged to move the heat of the core 60 to the internal space of the insulating housing 50, that is, to extend toward the internal space of the insulating housing 50. A sectional shape of the heat-dissipating path 82 can be, for example, rectangular and may have another shape. The heat-dissipating path 82 is preferably arranged to connect the exposed portion ER to the through opening 54 through the shortest path.

Figure 4:
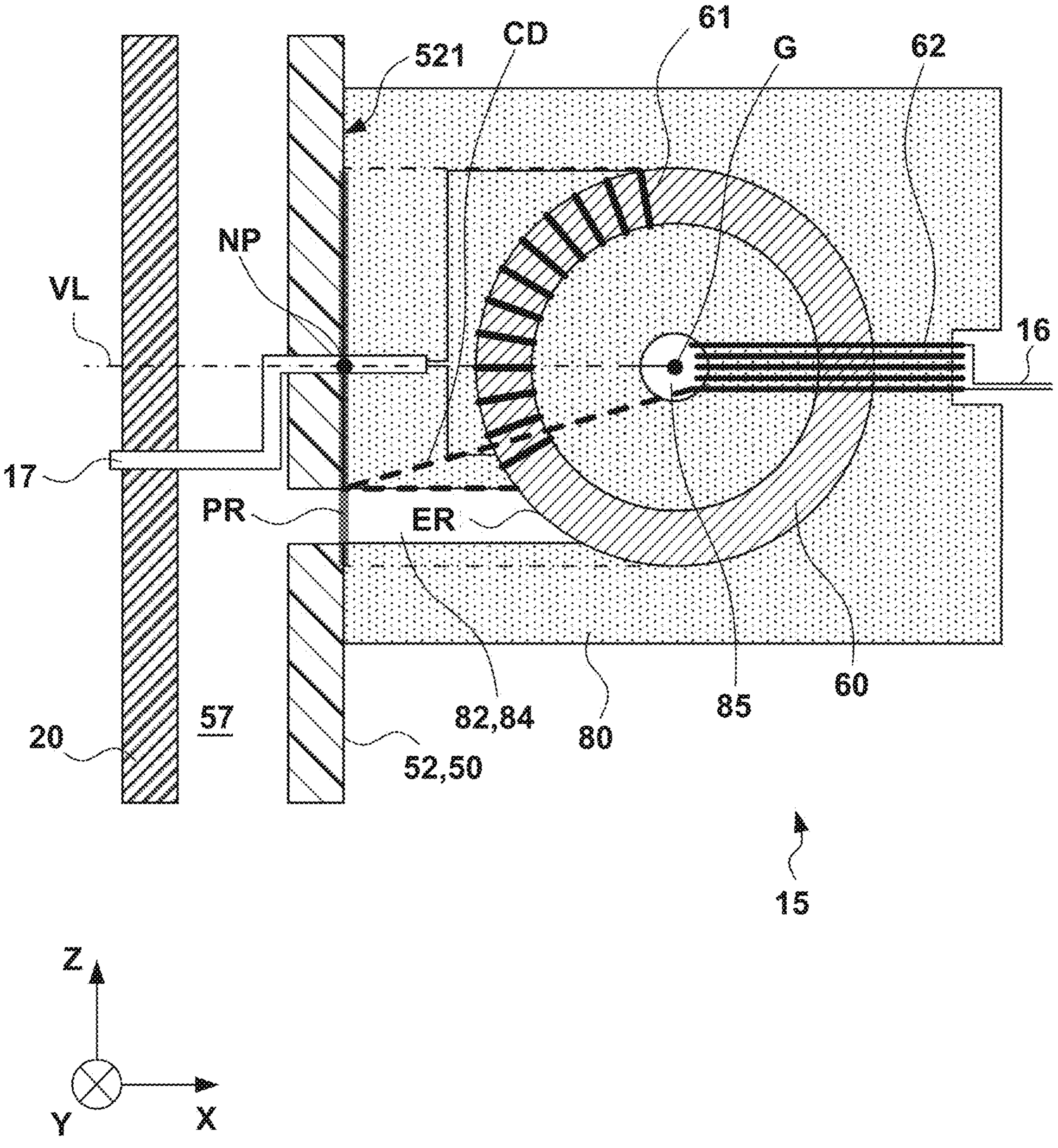
FIG. 4 is a sectional view schematically showing the arrangement of the mold transformer.

The preferable placement of the heat-dissipating path 82 will be described with reference to FIG. 4. The heat-dissipating path 82 is preferably arranged at a position away from a virtual line VL extending through a position NP on the wall 52 of the insulating housing 50 which is nearest to a center G of the core 60 and the center G of the core 60. In another aspect, the heat-dissipating path 82 is preferably arranged at a position away from the virtual line VL extending through the center G of the core 60. In still another aspect, the heat-dissipating path 82 is preferably arranged at a position where at least part of the heat-dissipating path 82 does not overlap the virtual line VL. Such placement is advantageous in increasing creepage distance CD between the secondary winding 62 and the exposed portion ER. Note that the creepage distance can be the shortest when the heat-dissipating path 82 is arranged so as to overlap the virtual line VL. In addition, arranging the heat-dissipating path 82 at a position away from the virtual line VL is advantageous in increasing the area of the exposed portion ER facing a section of the heat-dissipating path 82, that is, increasing the efficiency of heat dissipation from the core 60 (the exposed portion ER) to the heat-dissipating path 82. The area of the exposed portion ER facing a section of the heat-dissipating path 82 is proportional to the length of the arc of the exposed portion ER. As exemplarily shown in FIG. 4, the heat-dissipating path 82 can be arranged such that at least part of the region where the heat-dissipating path 82 orthogonally projected to a planar surface including the support surface 521 of the wall 52 falls within a region PR where the core 60 is orthogonally projected to the planar surface.

Figure 5:
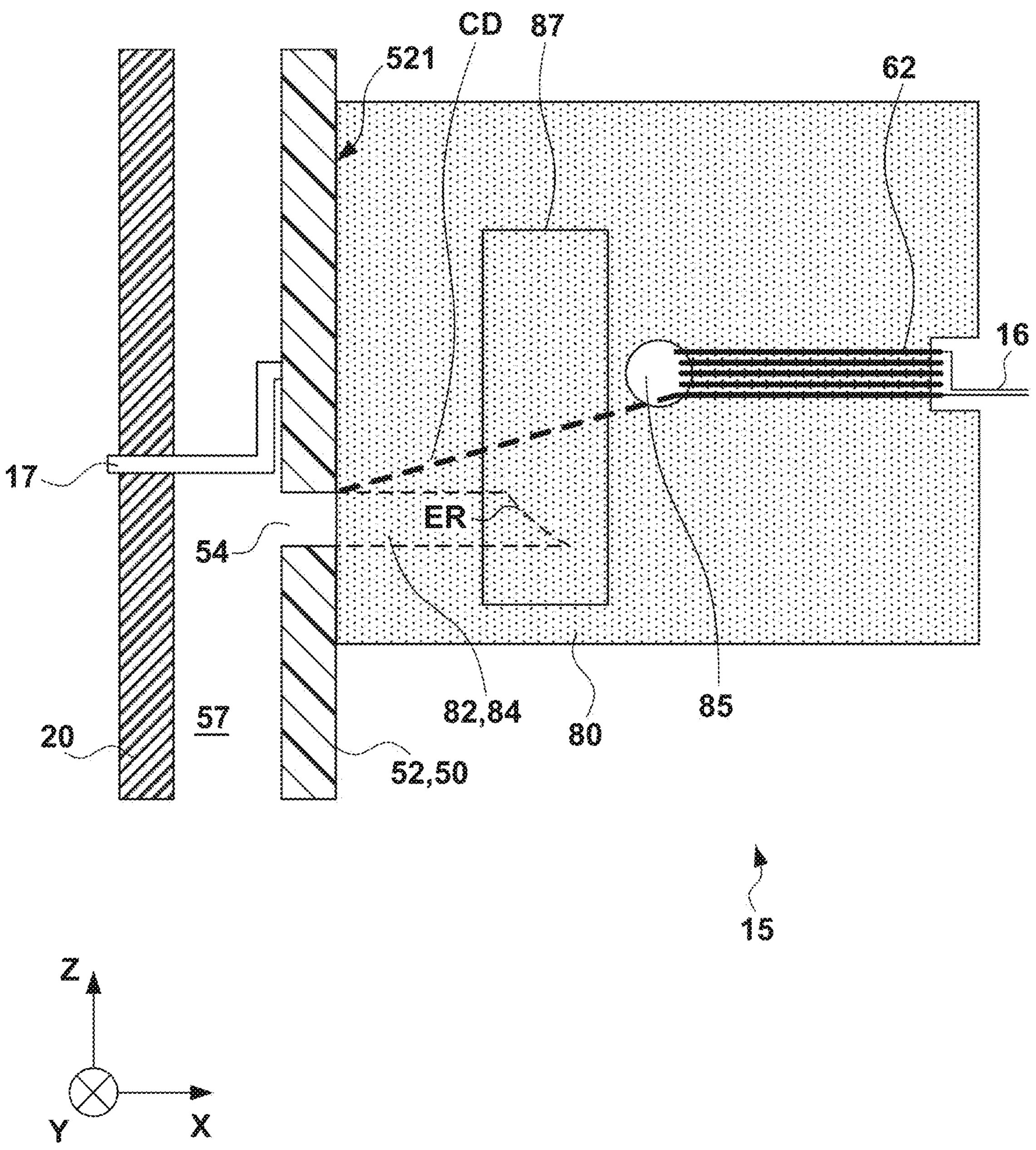
FIG. 5 is a side view schematically showing the arrangement of the mold transformer.

FIG. 5 is a side view of the mold transformer 15 when viewed from the minus direction of the Y-axis. The insulator 80 preferably has unevenness 87 on a path (a path defining the creepage distance CD) extending from the secondary winding 62 to the core 60 (the exposed portion ER) along the surface of the insulator 80. The unevenness 87 can function to increase the creepage distance CD and improve the insulation performance.

Figure 6:
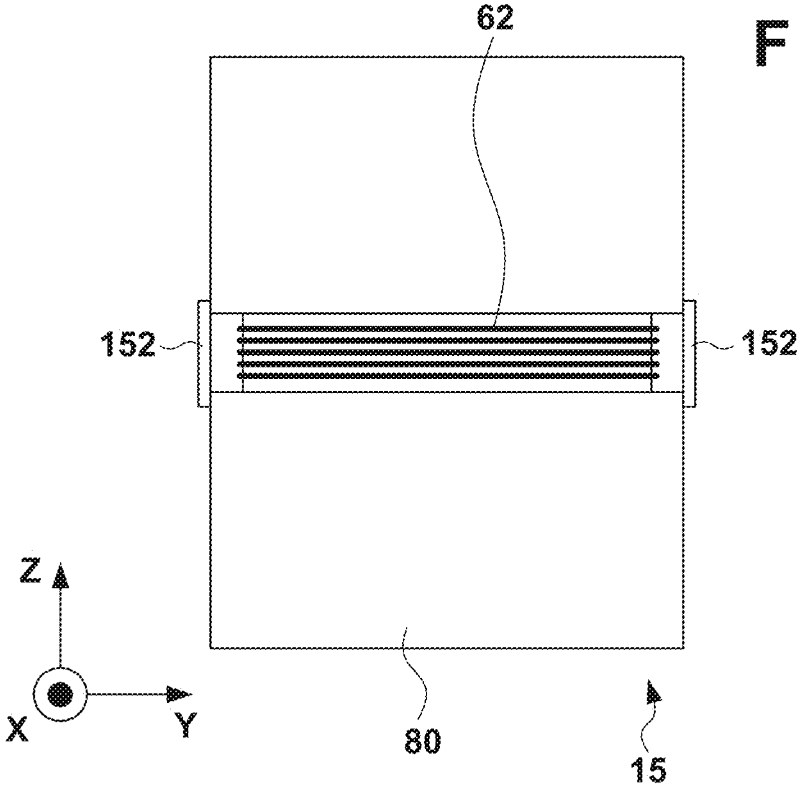
FIG. 6 is a side view schematically showing the arrangement of a modification of the mold transformer.

FIG. 6 shows a modification of the mold transformer 15. FIG. 6 is a side view of the modification of the mold transformer 15 viewed from the plus direction of the X-axis. The modification of the mold transformer 15 includes an insulating member 152 covering at least part of the secondary winding 62 (second winding). The insulating member 152 can function to improve the insulation performance.

Figure 7:
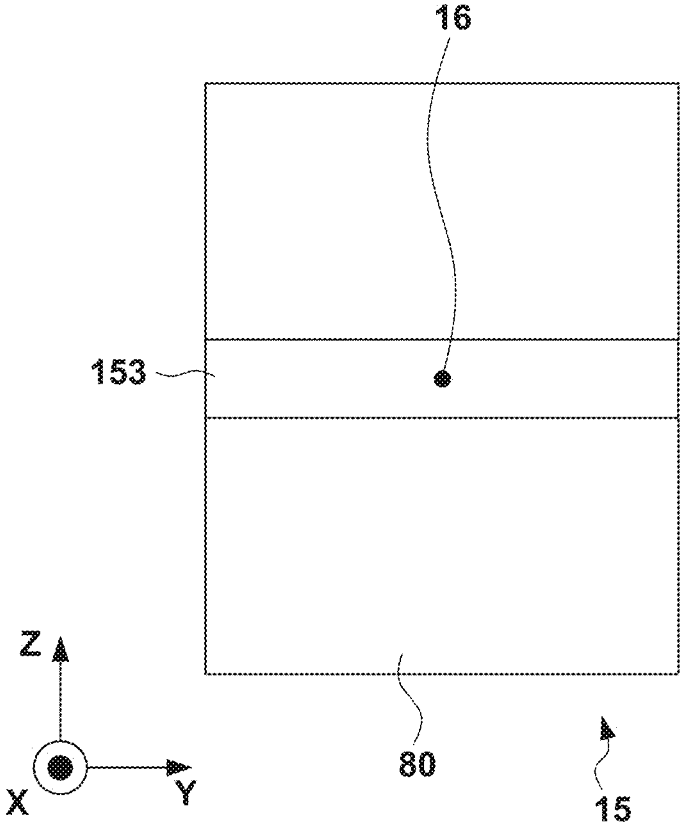
FIG. 7 is a side view schematically showing the arrangement of another modification of the mold transformer.

FIG. 7 shows another modification of the mold transformer 15. FIG. 7 is a side view of another modification of the mold transformer 15 viewed from the plus direction of the X-axis. Another modification of the mold transformer 15 includes an insulating member 153 covering at least part of the secondary winding 62 (second winding). The insulating member 153 can function to improve the insulation performance. The insulating member 153 is formed by, for example, molding.

Figure 8:
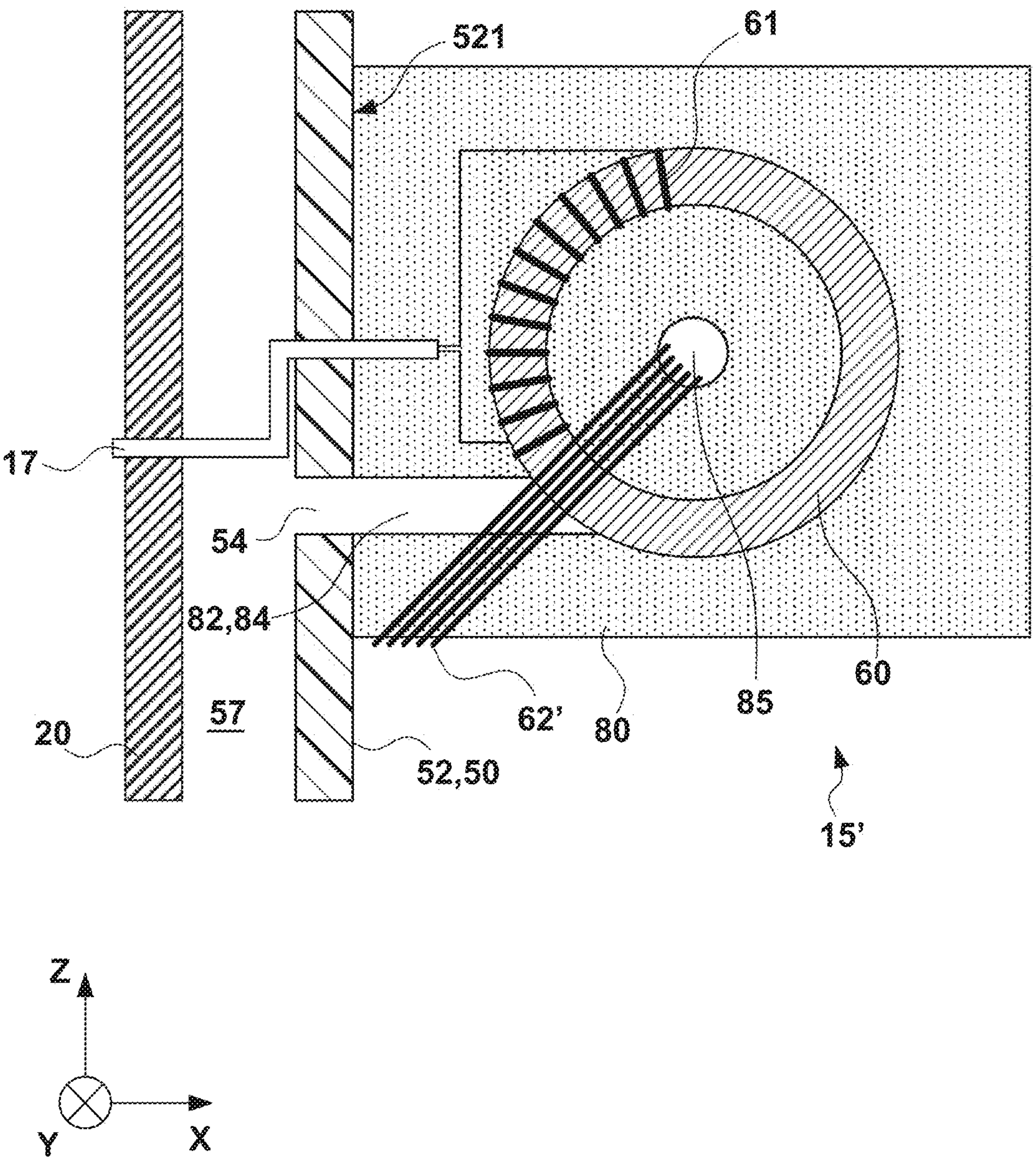
FIG. 8 is a sectional view schematically showing the arrangement of a mold transformer according to a comparative example.

In the mold transformer 15 described above, as exemplarily shown in FIGS. 2 to 8, the second winding 62 is arranged so as not to surround the heat-dissipating path 82. In another aspect, the second winding 62 is arranged at a position different from the position where the heat-dissipating path 82 is surrounded. Such an arrangement is advantageous in increasing the creepage distance CD and improving the insulation performance. FIG. 8 shows a mold transformer 15' as a comparative example. The mold transformer 15' as the comparative example is arranged such that a second winding 62' surrounds the heat-dissipating path 82. The comparative example indicates that the shortest distance (creepage distance) between the secondary winding 62' along the surface of the insulator 80 and the core 60 (the exposed portion ER) is short.

Figure 9:
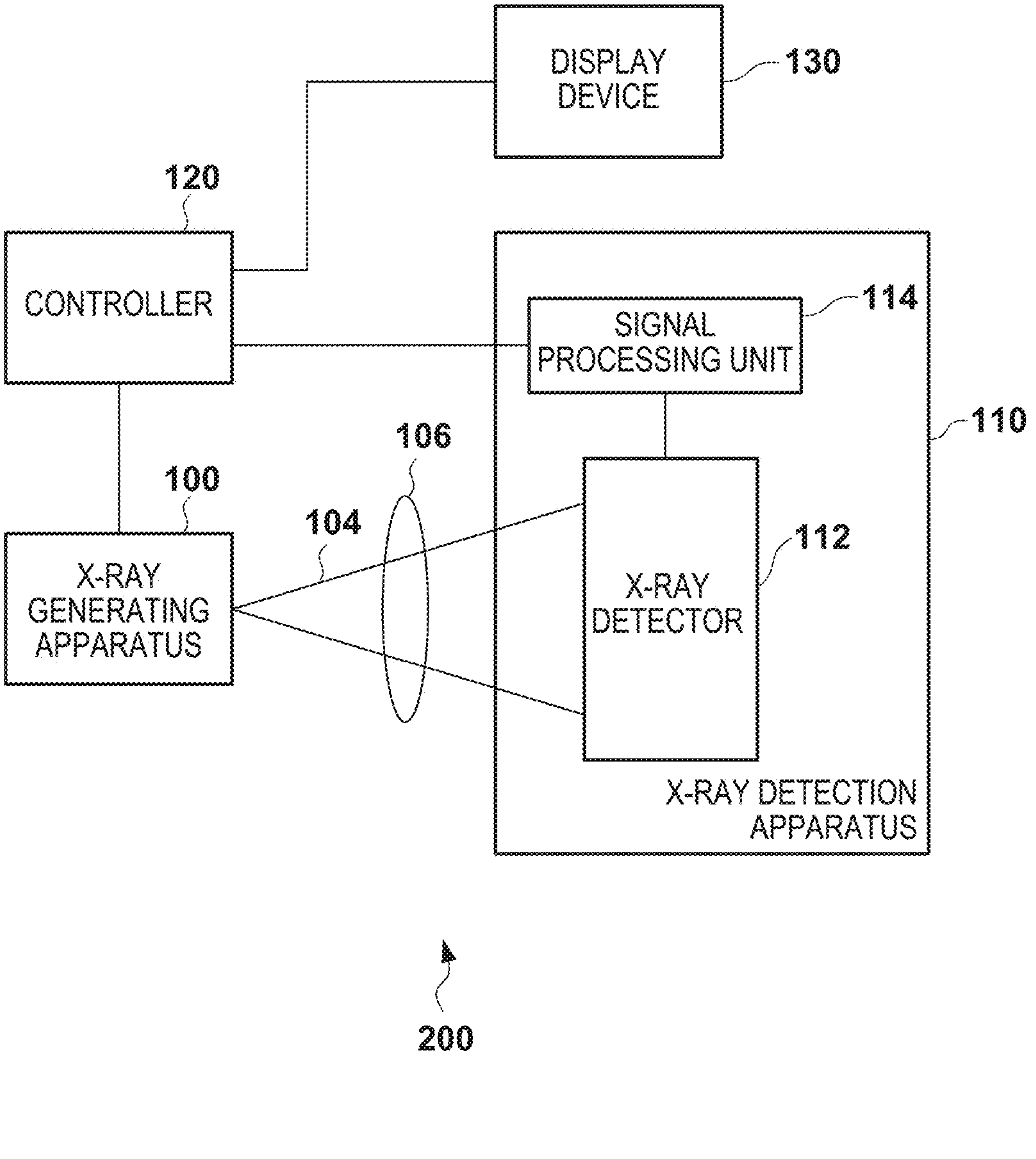
FIG. 9 is a view schematically showing the arrangement of an X-ray imaging apparatus according to an embodiment.

FIG. 9 shows the arrangement of an X-ray imaging apparatus 200 according to an embodiment of this disclosure. The X-ray imaging apparatus 200 can include the X-ray generating apparatus 100 and an X-ray detector 112 that detects X-rays 104 emitted from the X-ray generating apparatus 100 and transmitted through an object 106. The X-ray imaging apparatus 200 may further include a controller 120 and a display device 130. The X-ray detector 112 can include the X-ray detector 112 and a signal processing unit 114. The controller 120 can control the X-ray generating apparatus 100 and the X-ray detector 112. The X-ray detector 112 detects or captures the X-rays 104 emitted from the X-ray generating apparatus 100 and transmitted through the object 106. The signal processing unit 114 can process the signal output from the X-ray detector 112 and supply the processed signal to the controller 120. The controller 120 can cause the display device 130 to display an image based on the signal supplied from the signal processing unit 114.

The present invention is not limited to the above embodiments and various changes and modifications can be made within the spirit and scope of the present invention. Therefore, to apprise the public of the scope of the present invention, the following claims are made.

The invention claimed is:

1. An X-ray generating apparatus comprising a storage housing, an insulating housing arranged in the storage housing, an X-ray generating tube arranged at least partly in the insulating housing, and a plurality of electrical components arranged in the insulating housing, wherein the plurality of electrical components include a mold transformer, the mold transformer includes a core, a first winding wound around the core, an insulator covering a first portion of the core and not covering a second portion of the core, a second winding wound around the core through the insulator, and a heat-dissipating path configured to move heat from the core to an external space of the insulator, wherein the first winding is wound around the first portion of the core and is not wound the second portion, and wherein the heat-dissipating path includes a hole provided in the insulator to extend from the external space toward the second portion of the core.

2. The X-ray generating apparatus according to claim 1, wherein the heat-dissipating path is filled with an insulating liquid.

3. The X-ray generating apparatus according to claim 2, wherein the heat-dissipating path communicates with a space between the storage housing and the insulating housing.

4. The X-ray generating apparatus according to claim 1, wherein the heat-dissipating path includes a member formed from an insulating material having a higher thermal conductivity than the insulator.

5. An X-ray generating apparatus comprising a storage housing, an insulating housing arranged in the storage housing, an X-ray generating tube arranged at least partly in the insulating housing, and a plurality of electrical components arranged in the insulating housing, wherein the plurality of electrical components include a mold transformer, the mold transformer includes a core, an insulator covering the core, and a heat-dissipating path configured to move heat from the core to an external space of the insulator, and the heat-dissipating path includes a hole provided in the insulator to extend from the external space toward the core, wherein the insulating housing includes a wall including a support surface supporting the mold transformer, and the heat-dissipating path is arranged at a position away from a virtual line extending through a position on the wall which is nearest to a center of the core and the center.

6. The X-ray generating apparatus according to claim 5, wherein the heat-dissipating path is arranged such that at least part of a region where the heat-dissipating path is orthogonally projected on a planar surface including the support surface falls within a region where the core is orthogonally projected on the wall.

7. The X-ray generating apparatus according to claim 2, wherein the second portion is exposed to the insulating liquid filled in the hole, or exposed to the insulating liquid filled in the hole through a film.

8. The X-ray generating apparatus according to claim 1, wherein the insulator has a through hole, and the second winding is wound around the core through the insulator so as to extend through the through hole.

9. The X-ray generating apparatus according to claim 8, wherein the first winding is a primary winding, and the second winding is a secondary winding.

10. The X-ray generating apparatus according to claim 8, wherein the first winding is a secondary winding, and the second winding is a primary winding.

11. The X-ray generating apparatus according to claim 8, wherein the mold transformer further includes an insulating member covering at least part of the second winding.

12. The X-ray generating apparatus according to claim 8, wherein the insulator has unevenness on a path extending from the second winding to the core along a surface of the insulator.

13. The X-ray generating apparatus according to claim 8, wherein the second winding is arranged so as not to surround the heat-dissipating path.

14. An X-ray imaging apparatus characterized by comprising:

an X-ray generating apparatus defined in claim 1; and an X-ray detector configured to detect X-rays emitted from the X-ray generating apparatus.

* * * * *